J. M. BOWEN.
TRACTOR.
APPLICATION FILED NOV. 7, 1919.
1,343,303.
Patented June 15, 1920.
2 SHEETS—SHEET 1.
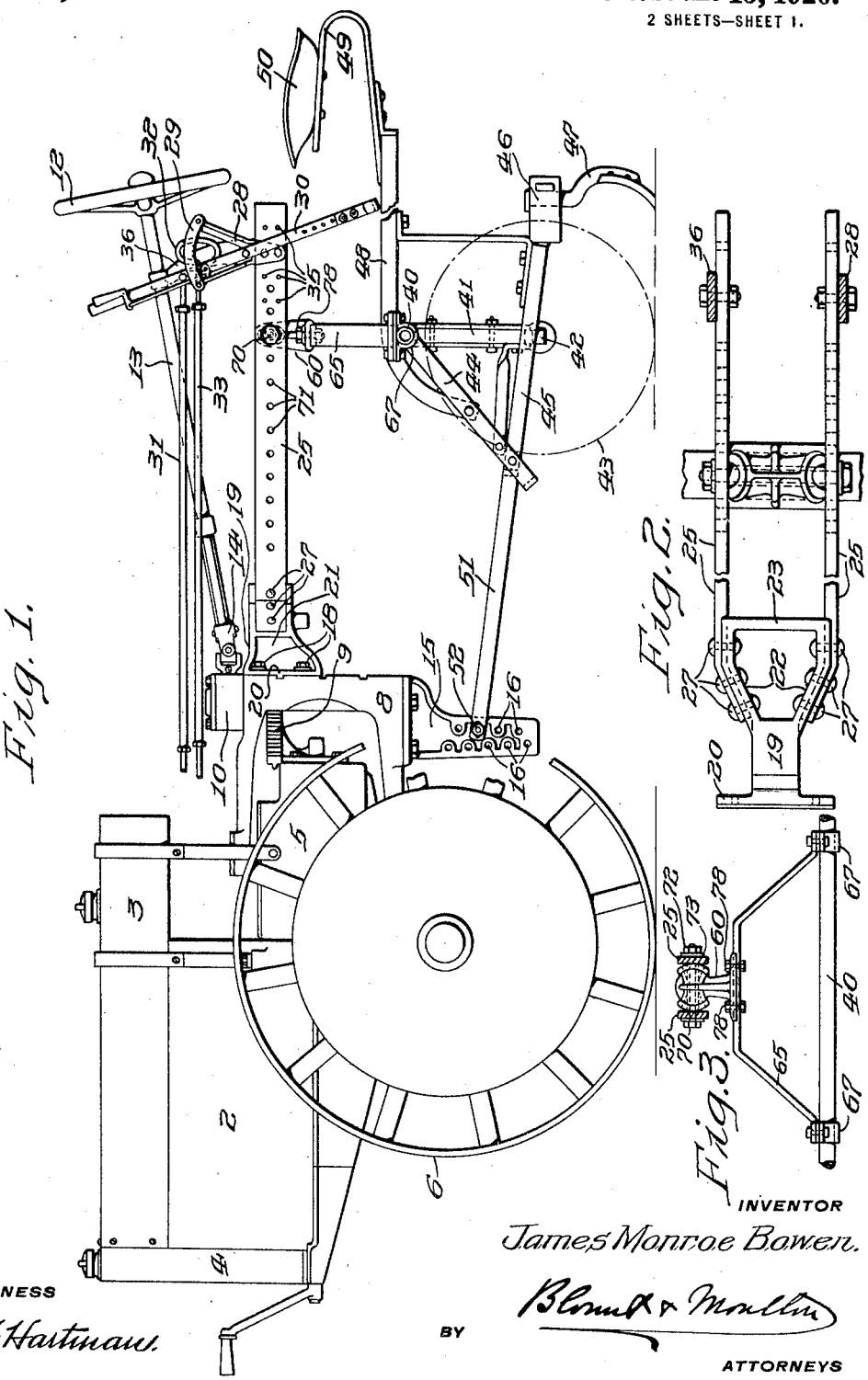
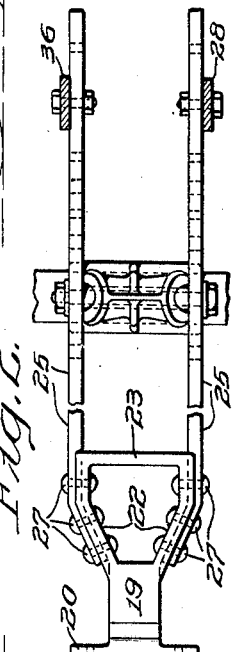
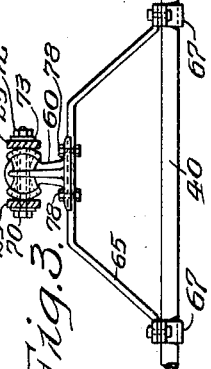
INVENTOR
James Monroe Bowen.
WITNESS
F. J. Hartman.
BY
Blount & Mullin
ATTORNEYS

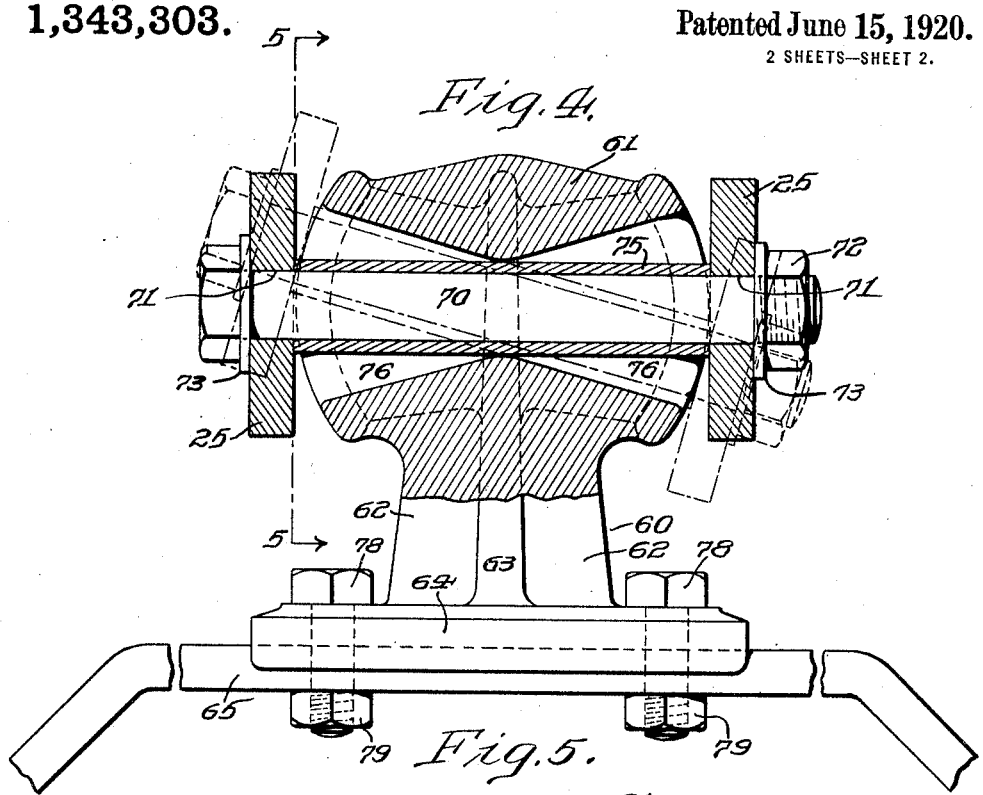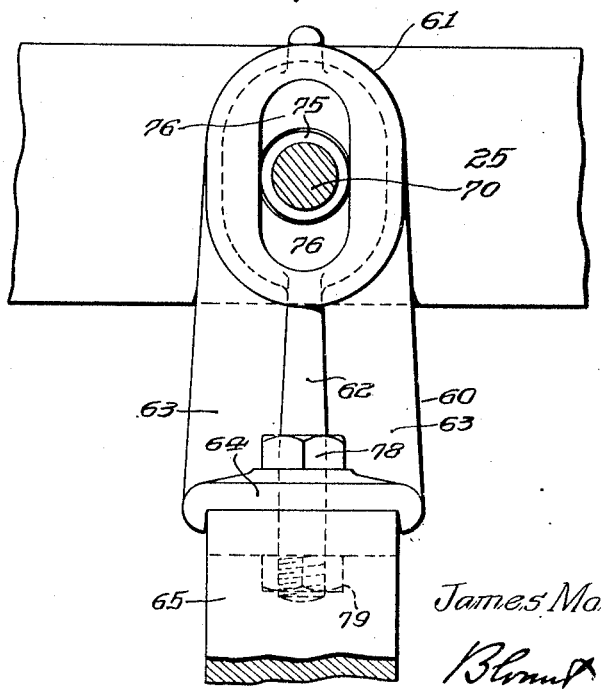

UNITED STATES PATENT OFFICE.

JAMES MONROE BOWEN, OF CAPE MAY COURT HOUSE, NEW JERSEY, ASSIGNOR TO S. L. ALLEN & CO., INC., A CORPORATION OF PENNSYLVANIA.

TRACTOR.

1,343,303.　　　　　Specification of Letters Patent.　　Patented June 15, 1920.

Application filed November 7, 1919. Serial No. 336,308.

*To all whom it may concern:*

Be it known that I, JAMES MONROE BOWEN, a citizen of the United States, and a resident of Cape May Court House, county of Cape May, and State of New Jersey, have invented certain new and useful Improvements in Tractors, of which the following is a specification, reference being had to the accompanying drawings.

The present invention relates more particularly to that class of tractors adapted for agricultural use, in which the power unit is supported by, and swings with, a pair of driving and steering wheels, the tractor being intended for interchangeable connection with some form of trailing implement which affords support for the rear end of the tractor and prevents the same from tilting forward or backward on its single pair of wheels. In order that the most satisfactory results may be accomplished in the operation of the tractor, particularly in agricultural work, it is desirable that the connection between the tractor and the trailed implement afford a certain amount of flexibility to thereby permit relative movement, within limits, between the tractor and the implement when traveling over rough ground and under other conditions when the same may be necessary.

A principal object of the present invention is to provide means for effecting a connection between the tractor and the trailed implement adapted to afford the requisite flexibility therebetween. A further object of the invention is to provide a connecting means of this character which may be readily employed to form a connection between the tractor and varying types of farm implements and the like so that the tractor may be readily employed with the different forms of implements ordinarily employed in agriculture and allied industries. A still further object of the invention is to provide means for connecting a two wheel tractor and a trailing implement at two points, one of the said connections being adapted to sustain the draft of the trailed vehicle and the other to so connect the tractor and the vehicle as to permit relative movement therebetween when required, while affording a support for the rear end of the tractor and preventing the same from tilting forward or backward about the axis of rotation of its wheels.

Additional objects of my invention are to provide means for effecting a flexible connection between a two wheel tractor and a trailed implement or vehicle which shall be simple in construction, not liable to get out of order, adapted for use with varying types and classes of trailed implements, and which may be manufactured at a relatively low cost.

My invention further includes all of the other various objects and novel features of construction and arrangement hereinafter more definitely specified and described.

In the accompanying drawings, I have illustrated a preferred embodiment of my invention as applied to a two wheel tractor and serving to connect the same with one form of cultivator, but it will be understood that the invention is equally adapted for use in connecting a tractor with other forms or types of agricultural implements, vehicles, or the like, and, in consequence, I have shown only so much of the cultivator and that somewhat diagrammatically, as is necessary to a clear understanding of my invention. Additionally, as the invention is adapted for use with any desired form of tractor having a suitable motor or other power means, driving wheels and means for connecting the power mechanism therewith, I have merely shown these parts of the tractor diagrammatically as the same form no part of my invention and may be of any suitable or desired character and construction.

In the said drawings, Figure 1 is a side elevation of a two wheel tractor of suitable form, embodying my invention and connected to a cultivator as aforesaid; Fig. 2 is an enlarged top plan view of a portion of the tractor, certain parts shown in Fig. 1 being removed; Fig. 3 is a fragmentary end elevation of a portion of the implement and the connecting mechanism; Fig. 4 is an enlarged detail view partially in central vertical section of a portion of the connecting mechanism, and also showing in broken lines the relative position of the parts assumed during certain conditions of operation, and Fig. 5 is a side elevation thereof, partially in section on line 5—5 in Fig. 4 looking in the direction of the arrows. Like numerals are employed to designate the same parts in the various figures.

The tractor proper, which, as stated, may be of any suitable form and construction, may comprise a suitable power mechanism located beneath a hood 2 above which may be conveniently supported a fuel tank 3 and in front of which may be located a radiator 4. In the rear of the power mechanism and rigidly secured thereto is the transmission case or housing 5 containing a suitable transmission mechanism, these parts being operatively connected with, and supported by, the driving or traction wheels 6, one of which is located on each side of the center line of the machine. It will be understood that suitable gearing or other means are provided by which the power generated by the power mechanism may be communicated to the wheels through the transmission mechanism and a suitable clutch, to drive them forward or backward as may be desired.

A yoke 8 preferably pivotally supported at points adjacent the top and bottom of the transmission housing extends rearwardly thereof and is arranged for movement in a horizontal plane relative thereto, suitable means being provided for imparting such movement to the yoke during the operation of the tractor. These means, which may be of any desired form or construction, may conveniently comprise a horizontally positioned rack 9, secured to and extending rearwardly from the transmission housing, adapted for engagement by a pinion (not shown) supported on a vertically extending shaft movable with the yoke and extending upwardly into a housing 10 carried thereby. Within this housing may be conveniently positioned suitable mechanism for imparting rotation to the shaft, as, for example, a horizontally positioned worm engaging a worm gear on the shaft and arranged for rotation from the steering wheel 12 operatively connected, through the steering post 13 and universal joint 14, with the worm. However, the details of the mechanism for steering the tractor by swinging the yoke about its vertical pivots form no part of this invention, and may therefore be of any convenient construction suitable for accomplishing the results desired, as will be well understood by those familiar with the art.

Depending downwardly from the lower face of the yoke, may be arranged a vertically extending draft plate 15 provided with a plurality of holes 16 positioned one above the other to adapt the plate for the attachment of the tongue, draw bar or corresponding parts of the implement with which the tractor is to be employed. The draft plate, which is of sufficient strength to take the draft of the implement when in operation, is preferably formed separately from the yoke and securely bolted thereto as shown, and preferably positioned midway between the side faces of the yoke so that when the latter is at the center of the rack the draft plate will lie in the plane of the center line of the tractor.

Either formed integrally therewith, or formed separately and secured to the rear face of the yoke by suitable bolts 18, is a rearwardly extending bracket 19 which, if formed separately, may conveniently comprise a base 20 adapted to seat on the yoke, a rearwardly extending and vertically positioned web 21 and a pair of outwardly and rearwardly divergent plates 22, the laterally spaced outer extremities of which are, however, preferably arranged parallel with the center line of the tractor and connected by a transversely extending web 23. To enhance the strength of the several parts, as well as for more securely positioning the beam forming members hereinafter referred to with respect thereto, the web 21 and arms 22 may preferably be provided adjacent their upper and lower extremities with outwardly directed flanges.

Rigidly secured to each of the arms 22 and extending rearwardly from the bracket on either side of the central line of the machine are a pair of laterally spaced members 25, said members being disposed in parallel relation and together forming what may be termed the "beam" of the tractor. These members are suitably rigidly secured to the arms of the bracket as by the rivets 27, and may each preferably consist of a flat, vertically positioned, and longitudinally extending plate of steel or other suitable material. Near the outer end of one of these members may conveniently be positioned a bracket 28 carrying a quadrant 29 coöperative with a clutch lever 30, which, through a suitable connecting member 31, may be arranged to control the clutch (not shown) with which the tractor is supplied. Other controlling devices, as for example, the handle 32 on the end of a control member 33, may be also supported by the bracket 28, or otherwise, near the ends of the members 25 and arranged to operate any desired part of the power control mechanism, as for instance, the gear shifting means. In order that the various control members and steering wheel may be brought within convenient reach of the tractor operator when seated on the seat of the trailing implement, the outer extremity of the member 25 may be provided with a plurality of suitably disposed bolt holes 35, so that the position of the bracket 28 may be adjusted as desired with respect to the beam, as may also be a standard 36 secured to the beam and serving to conveniently support the outer end of the steering post 13, suitable provision, of course, being made for extending or shortening the control members to correspond with the different positions to which the bracket 28 may be adjusted, as will be well understood by those familiar with the art.

As hitherto stated, a tractor of the general form and construction which I have described may be employed in conjunction with numerous and various types and forms of trailing vehicles, and in the drawings I have therefore illustrated somewhat diagrammatically a conventional form of cultivator connected with the tractor through the medium of my improved connection, only illustrating such parts of the cultivator as are necessary to a proper understanding of my invention. The form of cultivator shown comprises a transversely extending bar 40 supported on vertically extending supports 41 at the lower extremities of which are carried the axles 42 about which the wheels 43 are arranged to rotate. Extending downwardly and forwardly from the bar 40 are a plurality of braces 44 connected with the side frame members 45, at the rear extremities of which are positioned gang bars 46 carrying the cultivator blades 47. A seat support bar 48 riding on the transverse bar 40 and secured at its forward end at some convenient point, for example, the supports 44, projects rearwardly for any desired distance, a spring 49 secured thereto serving to support the operator's seat 50. Extending forward from the cultivator and rigidly secured to some convenient portion thereof, is the draw bar or tongue 51, by means of which the implement is drawn over the ground, and when the implement is in operative connection with the tractor this draw bar may be conveniently secured to the draft plate 15 in any preferred manner, for example, by means of a transversely extending bolt 52.

It will be understood that the particular construction and arrangement of the cultivator or other implement employed with the tractor may be modified from that which I have shown and described as the same forms no part of the present invention, so long as the cultivator or other form of implement utilized is capable of attachment to the draft plate or other convenient part of the tractor in order that the power necessary to pull the implement over the ground may be imparted thereto, and I therefore do not desire or intend to limit myself to the utilization of my invention with the particular form of cultivator or tractor which I have illustrated and described by way of example.

For the purpose of forming a flexible connection between the tractor and cultivator or other trailed implement or vehicle which connection will permit relative movement therebetween when required, while serving, during operation, to keep the beam of the tractor in a substantially horizontal position and preventing the tractor from unduly tilting forward or backward around the axis of rotation of its wheels, I provide a member 60 best shown in Figs. 4 and 5, which may comprise a laterally elongated head 61 supported upon, and preferably integral with, a vertically extending support, preferably comprising a plurality of flanges or webs 62, 63, arranged at right angles to each other and terminating in a laterally extending base 64 preferably longitudinally channeled along its lower face for the reception of a transversely extending strap or support 65, comprising a central horizontal portion and outwardly and downwardly directed end portions, which latter are suitably secured, as by clips 67, to the bar 40 or other convenient portion of the cultivator, in such manner as to permit relative movement of the clips and strap about bar 40, for a purpose to be hereinafter described.

The laterally extending head 61 of member 60 is preferably of slightly less width than the distance between the members 25 forming the tractor beam, so that it may be freely positioned between the members, and the faces of the ends of the head are convex in a vertical plane, being formed on arcs struck from its center, as clearly shown in Fig. 4, so that when the head is assembled between the beam members 25 as shown in said figure and as hereinafter described, it may freely oscillate in a vertical plane about its center between said members.

The head is arranged to be supported between members 25 upon a bolt 70 which extends through suitable alined holes 71 in each of the members and is secured in fixed relation with respect thereto by a nut 72, washers 73 being preferably disposed between the head of the bolt and the nut 72 and the outer faces of the members. Preferably, the bolt may be surrounded by a sleeve or bushing 75 of sufficient length to fill the space between the inner faces of the members which prevents the members 25 from being squeezed together when the nut 72 is set up on the bolt 70, although if desired this bushing may be omitted in certain constructions. For the reception of the bolt and bushing, if employed, the head 61 is provided with a transversely extending aperture 76, which, at the center of the head is preferably cylindrical and of slightly greater diameter than the exterior diameter of the bushing, so that the latter may pass easily therethrough, but the walls of which, from its center, as flared upwardly and downwardly toward the lateral faces of the head so that the mouths of the aperture are somewhat of the form of a flattened ellipse, the shorter diameter of which is substantially that of the exterior of the bushing 75, and the larger diameter sufficiently great to permit the bolt to oscillate laterally in either direction in a vertical plane to assume a position of considerable angularity with respect to the head, for example, as shown in broken lines in Fig. 4.

It will be understood that the strap or support 65 may for practical purposes be considered as one of the component parts of the cultivator or other implement, while the head 60 is supported on the bolt 70 between the members of the beam, thereby forming a portion of the tractor. When it is desired to operate the tractor and cultivator or other implement, the draw bar of the implement is connected with the draft plate of the tractor by a bolt or other suitable means, as heretofore described. As a plurality of pairs of the alined holes 71 are preferably provided in the beam, the head 60 may then be readily brought into substantially vertical alinement with the strap 65 or other portion of the implement to which it is to be secured, by arranging the bolt 70 in any desired pair of holes, after which the head may be secured by means of bolts 78 and nuts 79 to the strap with the strap resting in the channeled portion of the base, suitable apertures being arranged in the strap and in the base 64 for the passage of the bolts.

It will be observed that under these conditions, while the implement is firmly secured to the beam of the tractor, the connection between the beam and the cultivator or other implement is a flexible one in so far as the beam is free to assume an angular relation with respect to the cultivator within the limits afforded by the flaring mouths of the aperture 76, and by further reason of the fact that the head is free to turn about the transverse axis afforded by the bolt 70, so that the required freedom of movement between the beam and the trailed implement is assured under all conditions of operation. It will be evident that this motion may occur in either or both of two vertical and normally disposed planes but that rotation of the head 60 about its vertical axis is prevented. Moreover, as in any position of angularity which the beam may assume with respect to the head, the latter is prevented from lateral slippage in a direction parallel to the axis of the bolt 70 through the engagement of the curved faces of the head with the beam members 25 and as the head is prevented from turning on a vertical axis by reason of the engagement of the bushing with the substantially flat sides of the aperture 76, any skewing of the cultivator or other implement about a vertical axis or any lateral movement thereof with respect to the beam which would tend to bring the center line of the cultivator or other implement out of parallelism with the center line of the beam is avoided. Hence, as the beam is swung laterally in the operation of steering the tractor, the implement will always be maintained in proper alinement and relation therewith and will not skew or slue about with respect to the beam, while at the same time the latter is free to assume such angular position with respect to the head 60, and in turn, to the implement, as may be required by reason of the movement of the tractor with respect to the implement owing to inequalities of the surface of the ground, while at all times the connection between the beam and the implement itself is such that the former is prevented from unduly tilting up or down about the axis of rotation of the tractor wheels.

As the position of the blades 47 with regard to the ground surface depends, to a large extent, upon the point of attachment of the draw bar to the draft plate 15, and as it is necessary in attaching the implement to the tractor to bring the strap 65 into registry with the head 60, as well as to effect the connection of the draw bar with the draft plate, it is desirable, in order to permit an exact adjustment of the height of the cultivator blades to arrange for a movement of strap 65 about the axis of the bar 40 so that the vertical angle between the strap and the draw bar may be slightly varied while the connection is being made, a result conveniently accomplished by supporting the ends of the strap 65 on the clips 67 rotatable about the bar 40 as hitherto described. It will be understood, however, that once the connection between the implement and tractor is effected, the implement is thereafter maintained in operative relation with the beam, without relative movement between the clips 67 and the bar 40.

While I have herein described a preferred embodiment of my invention, in connection with a typical tractor and trailing implement, I do not thereby desire or intend to limit myself specifically thereto, as it will be understood that suitable modifications may be made in the form, arrangement and construction of the parts as may be desired, and that the invention may be employed in connection with other forms of tractors and with any desired type of trailing implement or vehicle without departing from the spirit and scope of the invention as defined by the appended claims.

Having thus described my invention, I claim and desire to protect by Letters Patent of the United States:—

1. In combination with a two wheel power mechanism having a rearwardly extending beam, and an implement adapted to be hauled by said power mechanism, means for connecting said beam and said implement comprising an operatively rigid member extending transversely of said beam, and a member connected to said implement surrounding and movable about said first mentioned member in vertical planes respectively parallel and normal to the longitudinal axis of said beam.

2. In combination with a two wheel power mechanism having a rearwardly extending beam, and an implement adapted to be hauled by said power mechanism, means for connecting said beam and said implement comprising a transversely extending cross member operatively rigid with said beam, and a member operatively rigid with said implement surrounding and movable about said first mentioned member in different vertical planes.

3. In combination with a two wheel power mechanism having a rearwardly extending beam, and an implement adapted to be hauled by said power mechanism, means for connecting said beam and said implement comprising a cross member extending transversely of said beam and operatively rigid with respect thereto, and a member operatively rigidly connected with said implement and having a head positioned within said beam and surrounding said cross member.

4. In combination with a two wheel power mechanism having a rearwardly extending beam, and an implement adapted to be hauled by said power mechanism, means for connecting said beam and said implement comprising a cross member extending transversely through said beam, and a member operatively rigidly attached to said implement and having a head affording a passage for said cross member, said passage being formed to permit relative movement between said head and said cross member in vertical planes.

5. In combination with a two wheel power mechanism having a rearwardly extending beam comprising laterally spaced side members, and an implement adapted to be hauled by said mechanism, means for connecting said beam and said implement comprising a bolt extending transversely between said side members and a head positioned between said members having a transverse passage for the reception of said bolt and operatively rigidly connected with said implement, said passage being cylindrical at its center and having its walls flared outwardly therefrom in a vertical plane to permit relative motion between said bolt and said head in vertical planes substantially normal to each other.

6. In combination with a two wheel tractor having a rearwardly extending beam comprising laterally spaced side members, and an implement adapted to be hauled by said tractor, means for operatively connecting said implement and said beam comprising a bolt extending transversely through said side members and operatively rigid with respect thereto, and a member operatively rigid with said implement and having a laterally elongated head disposed between the side members of said beam, the faces of said head adjacent said members being convex, said head providing an aperture for the passage of said bolt cylindrical at its center and having its walls flared outwardly in opposite directions in a vertical plane, whereby said head and said bolt are capable of relative motion in two normally disposed vertical planes and said head is prevented from movement in a horizontal plane with respect to said bolt by engagement of said bolt with the walls of said aperture.

7. In combination with a tractor having a rearwardly extending beam, means for connecting said beam and a trailing implement comprising a cross member fixed with respect to the beam and inclosed thereby, and a member surrounding and relatively movable about said fixed cross member in normally disposed vertical planes and adapted for rigid operative connection with the implement.

8. In combination with a tractor having an outwardly extending beam, means for connecting said beam and a trailing implement, said means comprising a bolt extending transversely between the members composing the beam and operatively rigid therewith, and a member capable of movement in vertical planes with respect thereto and comprising a head having a transversely extending aperture flared in opposite directions from its center and inclosing said bolt, said member being adapted for rigid operative connection with said implement.

9. In a tractor having an outwardly extending beam comprising laterally spaced members, means for connecting a trailing implement with said beam in a manner to permit relative movement between the implement and the beam and comprising a transversely extending member operatively stationary with respect to the beam and extending between said beam members, and a member surrounding said first mentioned member positioned between said beam members and adapted for rigid operative attachment to the implement, said member having an aperture for the reception of said first mentioned member, the walls of said aperture being flared outwardly from its center and in opposite directions therefrom.

10. In a tractor having an outwardly extending beam comprising laterally spaced plates, means for connecting a trailing implement with said beam in a manner to permit relative movement therebetween, and comprising a bolt operatively stationary with respect to and extending transversely between said plates, and a member adapted for rigid operative attachment to the implement surrounding said bolt and having a laterally extended head disposed between said plates having convex end faces and an aperture for the reception of said bolt, the walls of said aperture being flared outwardly from its center in opposite directions and substantially in a vertical plane.

In witness whereof, I have hereunto set my hand this 4th day of November, A. D. 1919.

JAMES MONROE BOWEN.